United States Patent Office 3,654,161
Patented Apr. 4, 1972

3,654,161
FERROMAGNETIC MATERIAL
John W. Geus, Geleen, Netherlands, assignor to Stamicarbon N.V., Heerlen, Netherlands
Filed Jan. 5, 1970, Ser. No. 577
Claims priority, application Netherlands, Jan. 4, 1969, 6900169
Int. Cl. C04b 35/00
U.S. Cl. 252—62.56                8 Claims

ABSTRACT OF THE DISCLOSURE

The present invention concerns a process for the preparation of a ferromagnetic material which is precipitated in a finely divided form onto a carrier material suspended in a solution containing the elements to be precipitated. The carrier material is generated in the liquid in which the precipitation of the ferromagnetic material will be carried out, by injecting a dissolved compound of the carrier material to be formed into the agitated liquid in which the carrier material is practically insoluble. An alkaline solution of silica is injected into the liquid, whose pH value is lower than 7, an acidic solution of metal ions from which the carrier material must be built up is injected into the liquid, whose pH value ranges between 4 and 7, or a solution of the elements from which the carrier material must be built up is injected in a readily hydrolysable form in a water-miscible solvent, into water as the liquid. The metal ions used are ions of aluminium, titanium, tin or thorium, or mixtures thereof, or use is made of hydrolysable chlorides such as $SiCl_4$, $AlCl_3$, $TiCl_4$, $SbCl_3$ or $SnCl_4$, or mixtures thereof, dissolved in methyl alcohol, ethyl alcohol or acetone and hydrolysable esters of inorganic acids and alcohols, such as $Al(OC_2H_5)_3$, $Sb(i-C_3H_7O)_3$, dissolved in methyl alcohol, ethyl alcohol or acetone.

---

The present invention relates to a process for the preparation of a ferromagnetic material which is precipitated in finely divided condition onto a carirer material suspended in a solution containing the elements to be precipitated.

Figure 1:
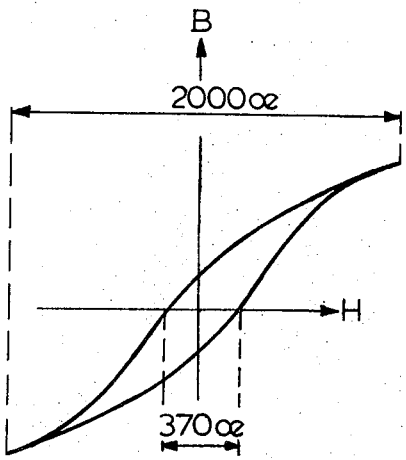
Figure 2:
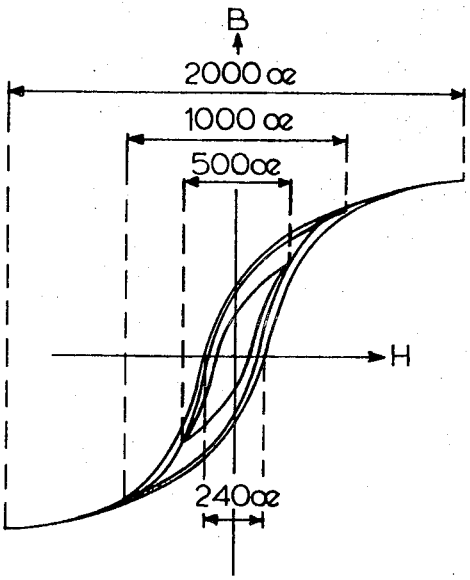

FIGS. 1 and 2 of the drawing show hysteresis loops of the material of Examples 1 and 2 respectively.

The preparation of this type of ferromagnetic materials is described in U.S. patent applications 743,000, 814,-703 both of which applications have been abandoned in favor of continuation-in-part application 108,081, filed Jan. 20, 1971, and Netherlands patent applications 6816682 and 6918247.

According to the methods described therein, the carrier material is preferably an inorganic, thermally stable material with a particle size of 1000 angstrom units or smaller. Very suitable are, for instance, the silica preparations known by the trade name of Aerosil, which are obtained by flame hydrolysis of silicon tetrachloride. Preparations which specific surface areas ranging from 140 to 450 m.$^2$ g.$^{-1}$ are commercially available.

The use of this type of carrier materials in powder form has certain disadvantages. The elementary particles of the carrier are strongly agglomerated. The degree of agglomeration cannot be reduced indefinitely during the suspension in the solution of the elements to be precipitated. Conglomerates of carrier particles with sizes from 1000 angstrom units up to 5000 angstrom units will always be present in the suspension. Owing to this fact it is difficult to achieve the required homogeneous distribution of the carrier material loaded with a magnetic component in an organic binding agent. Moreover, it is difficult to apply the material obtained to a polymer film in the form of a smooth and wear-resistant layer.

A known step in pigment preparation is to prepare the inert carrier in situ in the solution by mixing sulphuric acid with a solution of sodium silicate. Well defined carrier particles cannot be made in this way, because the pH of the solution and the concentration of the reacting ions change in a way that is difficult to reproduce.

By the process according to the invention, the carrier material is generated in the liquid in which the precipitation of the ferromagnetic material will be carried out, by injection of a dissolved compound of the carrier material to be formed into the agitated liquid in which the carrier material is practically insoluble. By "injection" is understood here that the two solutions are brought into contact with one another without any other phase being present in the immediate vicinity. In this way the solution is extremely rapidly distributed throughout said liquid, without the mutual dispersion being impeded by surface tensions. An essential condition of the present invention is that the generated carrier material is not intermediately separated from the liquid; it is possible either to generate the carrier in a solution of the elements to be precipitated, or to add the latter to the liquid after precipitation of the carrier.

Adequate choice of the concentration of the dissolved compound of the carrier material and of the rate of injection is a good means for controlling the dimensions of the particles in a reproducible manner.

Since the pH of the suspension can be kept at a given value during the injection, the electrostatic charge of the carrier particles and, hence, their dispersion and absorption capacity can be accurately controlled. The particles will show hardly any tendency to agglomerate.

Possible modes of realizing the process according to the invention are the following, which are illustrative and not limitative:

(1) injection of an alkaline solution of silica into the liquid, whose pH value is lower than 7;
(2) injection of an acidic solution of metal ions from which the carrier material must be built up, into the aqueous liquid, whose pH value ranges between 4 and 7. Examples are ions of aluminium, titanium, tin or thorium, or mixtures thereof;
(3) injection, into water as the liquid, of a solution of the elements from which the carrier material must be built up, in a readily hydrolysable form in a water-miscible solvent. Examples are hydrolysable chlorides such as $SiCl_4$, $AlCl_3$, $TiCl_4$, $SnCl_4$ or $SbCl_3$, dissolved in methyl alcohol, ethyl alcohol or acetone. Esters of inorganic acids, such as $Al(OC_2H_5)_3$ or $Sb(C_3H_7O)_3$, dissolved in said solvents, may also be used.

The invention is illustrated by some examples.

EXAMPLE I

Preparation of a cobalt-nickel alloy dispersed on silica 152 grams of $Co(NO_3)_2.6H_2O$ and 82 grams of $Ni(NO_3)_2.6H_2O$ were dissolved in 2 litres of distilled water. 45 ml. of 1 N HCl were added to this solution. The temperature of the solution was raised to 90° C., whereupon 25 ml. of a potassium silicate solution, containing 2.5 grams of $SiO_2$, was injected into the agitated solution in 20 minutes' time. At the end of the injection the pH of the suspension thus obtained was 2.85. Next, a solution of 69.3 grams of $NH_4HCO_3$ and 60 ml. of a 25 percent ammonia solution in 500 ml. of water were injected into the thoroughly agitated suspension at the same temperature, in 50 minutes' time. The injection was stopped when the pH had reached a value of 7.25. The violet precipitate could be readily filtered off; the filtrate (a total of 3 litres, including the wash water) contained 51 mg. of Co per litre and 409 mg. of Ni per litre.

After drying for 16 hours at 120° C. the material was pressed to pellets with a diameter of 2.8 mm. and a height of 2 mm. These pellets were reduced in a stream of hydrogen at 400° C. for 68 hours. Next, a column of approx. 20 cm. length was formed from the pellets in an inert atmosphere and the hysteresis loop of said column was determined, which had a shape as shown in FIG. 1. The coercive force was 370 oersteds. The magnetization shown in FIG. 1 on the vertical axis has only a relative significance.

EXAMPLE II

Preparation of a cobalt-iron oxide dispersed on silica 7.3 grams of $Co(NO_3)_2.6H_2O$, 60 grams of urea and 40 grams of ammonium nitrate were dissolved in 2 litres of distilled water. The solution was boiled to drive out the dissolved oxygen and cooled in a nitrogen atmosphere. After the pH value of the solution had been adjusted to 1.5 with nitric acid, 216 ml. of an $FeCl_2$ solution, containing 25.5 grams of iron, were added, whereupon 150 ml. of a potassium silicate solution, containing 3 grams of $SiO_2$, were injected into the agitated solution in 10 minutes' time. The pH value of the suspension thus obtained was 1.6. Next, the suspension was heated to 100° C. with thorough stirring; whilst the temperature rose from 50° C. to 90° C., the pH increased to 5. The colour of the suspension changed from light red through brown and grey to deep black. After heating at 100° C. for 28 hours the precipitation was found to be complete. The precipitate could be readily filtered and washed; the filtrate, which had a pH of 5.3, did not contain any Fe or Co.

After drying for 16 hours at 120° C. the material was pressed to pellets with a diameter of 2.8 mm. and a height of 2 mm. A column of approximately 20 cm. length was made from these pellets, and the hysteresis loop of this column was determined, which had a shape as shown in FIG. 2. The coercive force was 250 oersteds. The magnetization shown in FIG. 2 on the vertical axis has only a relative significance.

EXAMPLE III

The same process was carried out as described in Example II, except that instead of injecting the potassium silicate solution, 3 grams of silica "Aerosil 380" (manufacturer Degussa, specific surface area 380 m.$^2$ g.$^{-1}$) was suspended in the solution. The hysteresis loop of this material, determined in the same way as in Example II, was identical with that shown in FIG. 2.

The powdered materials prepared according to Examples II and III were mixed with a solution of 20 percent by weight of polyurethane in dimethyl formamide, and the mixtures were spread on polyester film. The amount of ferromagnetic powder contained in the coating was 60 percent by weight.

The powder prepared according to Example II with injection of potassium silicate proved to give an exceptionally smooth and wear-resistant layer. With the preparation made according to Example III the layer applied in the same way had a much rougher surface.

What is claimed is:

1. In a process for the preparation of a ferromagnetic material which is precipitated in a finely divided form onto a particulate carrier material suspended in an aqueous medium which said ferromagnetic material is precipitated, the improvement consisting essentially in generating said particulate carrier material within said aqueous medium, said medium containing ions of said ferromagnetic material to be precipitated, by agitating said aqueous medium and simultaneously injecting under the surface of said aqueous medium a solution containing a dissolved compound of said carrier material which compound will form said carrier material upon injection into said aqueous medium, said carrier material being substantially insoluble in said aqueous medium, whereby a homogeneous suspension of said particulate carrier material is formed in said aqueous medium and thereafter effecting precipitation of said ferromagnetic material onto said carrier material in said medium.

2. The process of claim 1 wherein said solution containing a dissolved compound of said carrier material is an alkaline solution of silica, which solution is injected into said aqueous medium, said aqueous medium having a pH of less than 7.

3. The process of claim 1 wherein said solution containing a dissolved compound of said carrier material is an acidic solution of metal ions, which solution is injected into said aqueous medium, said aqueous medium having a pH value in the range from 4 to 7.

4. The process of claim 3 wherein said metal ions are selected from the group consisting of ions of aluminum, titanium, tin, thorium, or mixtures thereof.

5. The process of claim 1 wherein said solution containing a dissolved compound of said carrier material is a solution of a hydrolysable compound from which said particulate carrier material may be generated, dissolved in a water-miscible solvent.

6. The process of claim 5 wherein said hydrolysable compound is a hydrolysable chloride selected from the group consisting of $SiCl_4$, $AlCl_3$, $TiCl_4$, $SbCl_3$, $SnCl_4$, or mixtures thereof, and said water-miscible solvent is selected from the group consisting of methyl alcohol, ethyl alcohol or acetone.

7. The process of claim 5 wherein said hydrolysable compound is a hydrolysable ester of an inorganic acid dissolved in a water-miscible solvent selected from the group consisting of methyl alcohol, ethyl alcohol or acetone.

8. The process of claim 7 wherein said hydrolysable ester is selected from the group consisting of $Al(OC_2H_5)_3$ or $Sb(i-C_3H_7O)_3$.

References Cited

UNITED STATES PATENTS

| 3,042,543 | 7/1962 | Schuele | 252—62.55 X |
| 3,428,425 | 2/1969 | Marotta | 23—182 |
| 3,193,349 | 7/1965 | Mooi | 23—143 |
| 2,715,060 | 8/1955 | Barry | 23—182 |
| 3,357,791 | 12/1967 | Napier | 23—143 |

JAMES E. POER, Primary Examiner

J. COOPER, Assistant Examiner

U.S. Cl. X.R.

252—62.51; 117—100, 235